United States Patent
Inamori (10) Patent No.: US 9,881,291 B2
(45) Date of Patent: Jan. 30, 2018

(54) OPERATION MANAGEMENT APPARATUS, OPERATION MANAGEMENT SYSTEM, AND COMPUTER-READABLE STORAGE MEDIUM

(71) Applicant: CASIO COMPUTER CO., LTD., Tokyo (JP)

(72) Inventor: Jun Inamori, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/195,634

(22) Filed: Jun. 28, 2016

(65) Prior Publication Data
US 2017/0039538 A1   Feb. 9, 2017

(30) Foreign Application Priority Data
Aug. 3, 2015  (JP) .................................. 2015-153469

(51) Int. Cl.
G06K 15/00 (2006.01)
G06Q 20/20 (2012.01)
G06K 19/06 (2006.01)

(52) U.S. Cl.
CPC ..... *G06Q 20/208* (2013.01); *G06K 19/06028* (2013.01); *G06K 19/06037* (2013.01)

(58) Field of Classification Search
CPC ........... G06Q 20/208; G06K 19/06028; G06K 19/06037
USPC ................................................. 235/375, 383
See application file for complete search history.

(56) References Cited

U.S. PATENT DOCUMENTS

| 2002/0023955 A1* | 2/2002 | Frank | G06Q 20/04 235/382 |
|---|---|---|---|
| 2002/0042798 A1* | 4/2002 | Takei | G06F 3/1207 715/274 |
| 2002/0091555 A1* | 7/2002 | Leppink | G06Q 10/02 705/5 |

(Continued)

FOREIGN PATENT DOCUMENTS

| JP | H9-81863 A | 3/1997 |
| JP | H9-319795 A | 12/1997 |

(Continued)

OTHER PUBLICATIONS

Japanese Office Action dated Dec. 5, 2017, issued in corresponding Japanese Patent Application No. 2015-153469 and English translation of the same. (6 pages).

*Primary Examiner* — Paultep Savusdiphol
(74) *Attorney, Agent, or Firm* — Fitch Even Tabin & Flannery LLP (57) ABSTRACT

An operation management apparatus includes a searching unit and a transmitting unit. According to a request from a register terminal, the searching unit searches for operation instruction information to be printed by the register terminal from a storage storing the operation instruction information showing contents of an operation instruction. The transmitting unit transmits to the register terminal print instruction information so that the register terminal prints the operation instruction information searched by the searching unit and confirmation information to notify that the operation instruction information is confirmed or that the contents of the operation instruction shown in the operation instruction information is finished.

12 Claims, 4 Drawing Sheets

(56) References Cited

U.S. PATENT DOCUMENTS

| | | | |
|---|---|---|---|
| 2004/0267677 A1 | 12/2004 | Mitsuoka et al. | |
| 2005/0091088 A1* | 4/2005 | Peterson | G07B 15/00 705/5 |
| 2005/0240453 A1* | 10/2005 | Lyons | G06Q 10/02 705/5 |
| 2006/0022036 A1* | 2/2006 | Peterson | G07B 15/00 235/384 |
| 2015/0332243 A1* | 11/2015 | Kamvysselis | G06Q 30/06 705/24 |

FOREIGN PATENT DOCUMENTS

| | | |
|---|---|---|
| JP | 2001-126147 A | 5/2001 |
| JP | 2002-358350 A | 12/2002 |
| JP | 2004-118271 A | 4/2004 |
| JP | 2005-18326 A | 1/2005 |
| JP | 2005-84713 A | 3/2005 |

\* cited by examiner

| ID | TITLE | CONTENTS | PERSON IN CHARGE | DUE DATE | NOTIFICATION START DATE | REPETITION | NOTIFICATION DATE | NOTIFICATION DESTINATION | CONFIRMATION DATE | FINISH DATE | REGISTRATION PERSON |
|---|---|---|---|---|---|---|---|---|---|---|---|
| 100000001 | ORDER OPERATION | AFTER CONFIRMING STOCK OF FOOD, ORDER TO ○× TRADING | ICHIRO TOKYO | 2015/6/20 10:00 | 2015/6/1 10:00 | 1 | 2015/6/2 10:00 | 1000000000 | 2015/6/2 13:00 | | ICHIRO KANAGAWA |
| 100000002 | STOCK CONFIRMATION | CONFIRM STOCK OF MERCHANDISE IN WAREHOUSE AND ON DISPLAY | JIRO TOKYO | 2015/6/10 10:00 | 2015/6/1 10:00 | 0 | 2015/6/3 15:00 | 1100000000 | 2015/6/3 16:00 | | JIRO KANAGAWA |

OPERATION MANAGEMENT APPARATUS, OPERATION MANAGEMENT SYSTEM, AND COMPUTER-READABLE STORAGE MEDIUM

CROSS-REFERENCE TO RELATED APPLICATION

This application is based upon and claims the benefit of priority from the prior Japanese Patent Application No. 2015-153469, filed on Aug. 3, 2015, the entire contents of which are incorporated herein by reference.

BACKGROUND OF THE INVENTION

1. Field of the Invention

The present invention relates to an operation management apparatus, an operation management system, and a computer-readable storage medium.

2. Background Art

Conventionally, in store operation, various techniques to provide information using a terminal in a store are well-known.

There is a technique disclosed to suitably combine fixed phrases based on customer data and purchase history data to make and print a message specialized for a certain customer (for example, Japanese Patent Application Laid-Open Publication No. 2001-126147).

There is a technique disclosed in which a message regarding sale items related to merchandise meeting a predetermined selection standard is printed on a receipt issued for each transaction (Japanese Patent Application Laid-Open Publication No. H09-81863).

Technique to manage operation instruction information (To Do information) including an operation instruction (To Do item) for each clerk involved in store operation is known. Basically, the To Do information can be displayed on a screen of a terminal such as a PC provided in a backyard of a store, and the clerks and manager can confirm the information.

However, since the clerks and manager are busy with their own operations during business hours of the store, it is difficult to always check the terminal screen provided in the backyard. Therefore, the contents of the To Do information confirmed before opening the store may be forgotten, and this may cause problems in store operation.

SUMMARY OF THE INVENTION

The present invention is made in view of the above problems, and the purpose of the present invention is to be able to directly communicate instructions regarding operations to each person in charge and easily enable confirming the contents and finish of the operation instruction.

According to an aspect of the present invention, there is provided an operation management apparatus including: a searching unit which, according to a request from a register terminal, searches for operation instruction information to be printed by the register terminal from a storage storing the operation instruction information showing contents of an operation instruction; and a transmitting unit which transmits to the register terminal print instruction information so that the register terminal prints the operation instruction information searched by the searching unit and confirmation information to notify that the operation instruction information is confirmed or that the contents of the operation instruction shown in the operation instruction information is finished.

According to the present invention, the suitable operation instruction can be printed and the operation instruction can be directly transmitted to the person in charge when the register terminal is used, and the confirmation of the contents of the operation instruction and the confirmation of finishing the operation instruction can be easily performed.

DETAILED DESCRIPTION OF THE PREFERRED EMBODIMENT

A detailed embodiment of the present invention is described with reference to the drawings.

First, a configuration of an operation management system 100 of the present invention is described.

Figure 1:
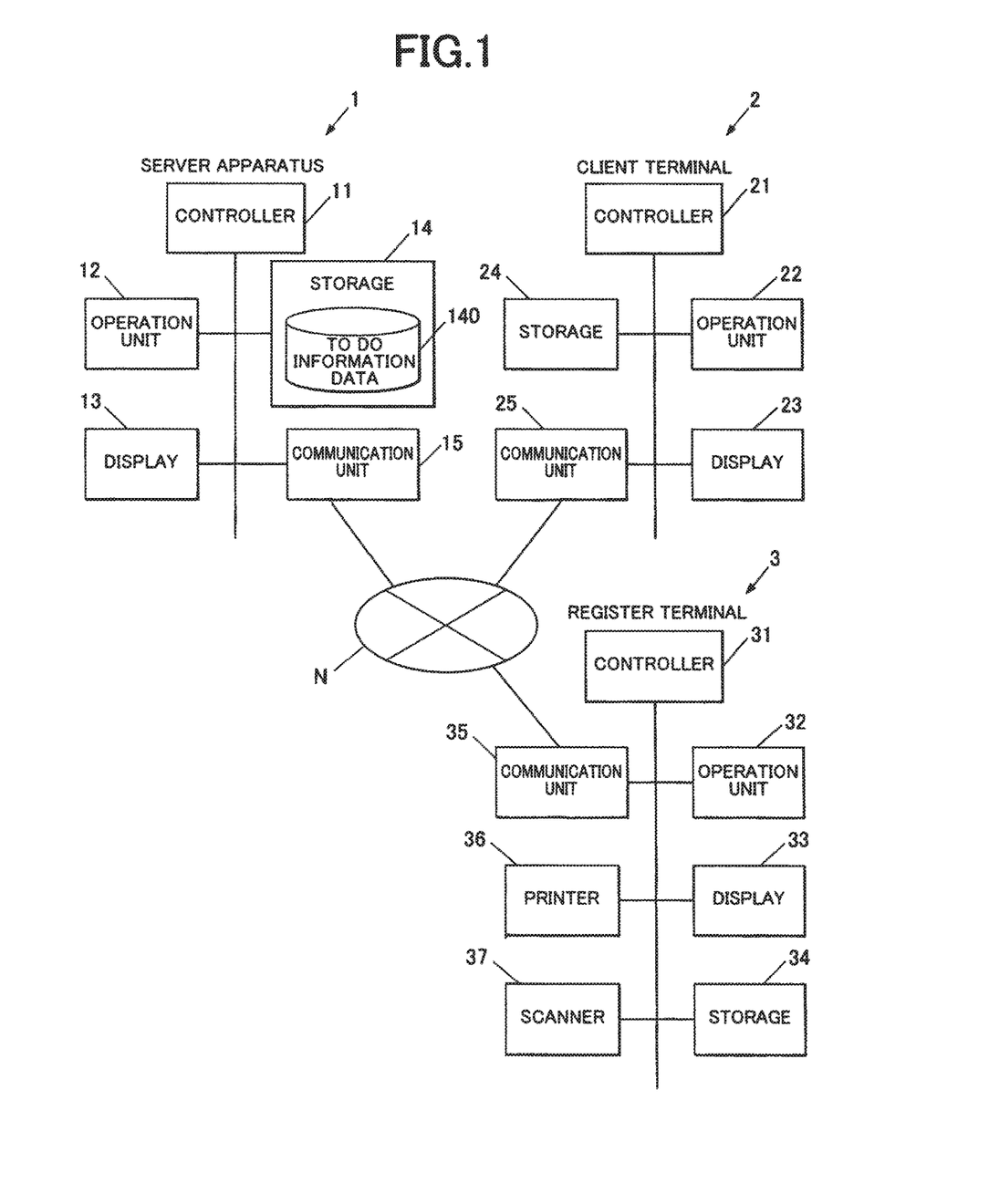
FIG. 1 is a block diagram showing a configuration of main control for each apparatus composing an operation management system according to the present embodiment.

As shown in FIG. 1, the operation management system 100 includes a server apparatus (operation management apparatus) 1, a client terminal 2, and a register terminal 3. In the operation management system 100, the server apparatus 1, the client terminal 2, and the register terminal 3 are connected to allow communication among one another through a communication network N. The communication network N is a communication network including wired LAN (Local Area Network), wireless LAN, mobile communication network, the Internet, and the like. The number of client terminals 2 is not limited.

The server apparatus 1 is an information device such as a PC, a WS (Work Station), etc. The server apparatus 1 is a schedule management server which manages an operation schedule, To Do items, and the like.

The server apparatus 1 is composed of one or a plurality of servers developed on a communication network N. The present embodiment is composed of one management server, however, a group of a plurality of servers can be structured including a WEB server, a DB server, and a storage server.

As shown in FIG. 1, the server apparatus 1 includes a controller 11, an operation unit 12, a display 13, a storage 14, and a communication unit 15.

The controller 11 centrally controls operation of the server apparatus 1. Specifically, the controller 11 includes a CPU, a ROM, a RAM or the like. The CPU in coordination with the program data stored in the ROM or the storage 14 developed in the work region of the RAM controls each unit of the server apparatus 1.

The operation unit 12 includes a keyboard including a character input key, a numeric input key, and other such keys corresponding to various functions, and a pointing device such as a mouse to receive input of operation from the user to output the operation signal corresponding to the input operation to the controller 11.

The display 13 includes a display such as a LCD (Liquid Crystal Display) and displays on a display screen an image based on a display control signal output from the controller 11.

The storage 14 includes a HDD (Hard Disk Drive), a semiconductor memory and the like, and stores data such as program data and various setting data received from the controller 11 as readable and writable data. The storage 14 stores To Do information data 140 which is operation instruction information showing the content of the To Do items (operation instruction). In other words, the storage 14 functions as the storage unit of the present invention.

Figure 2:
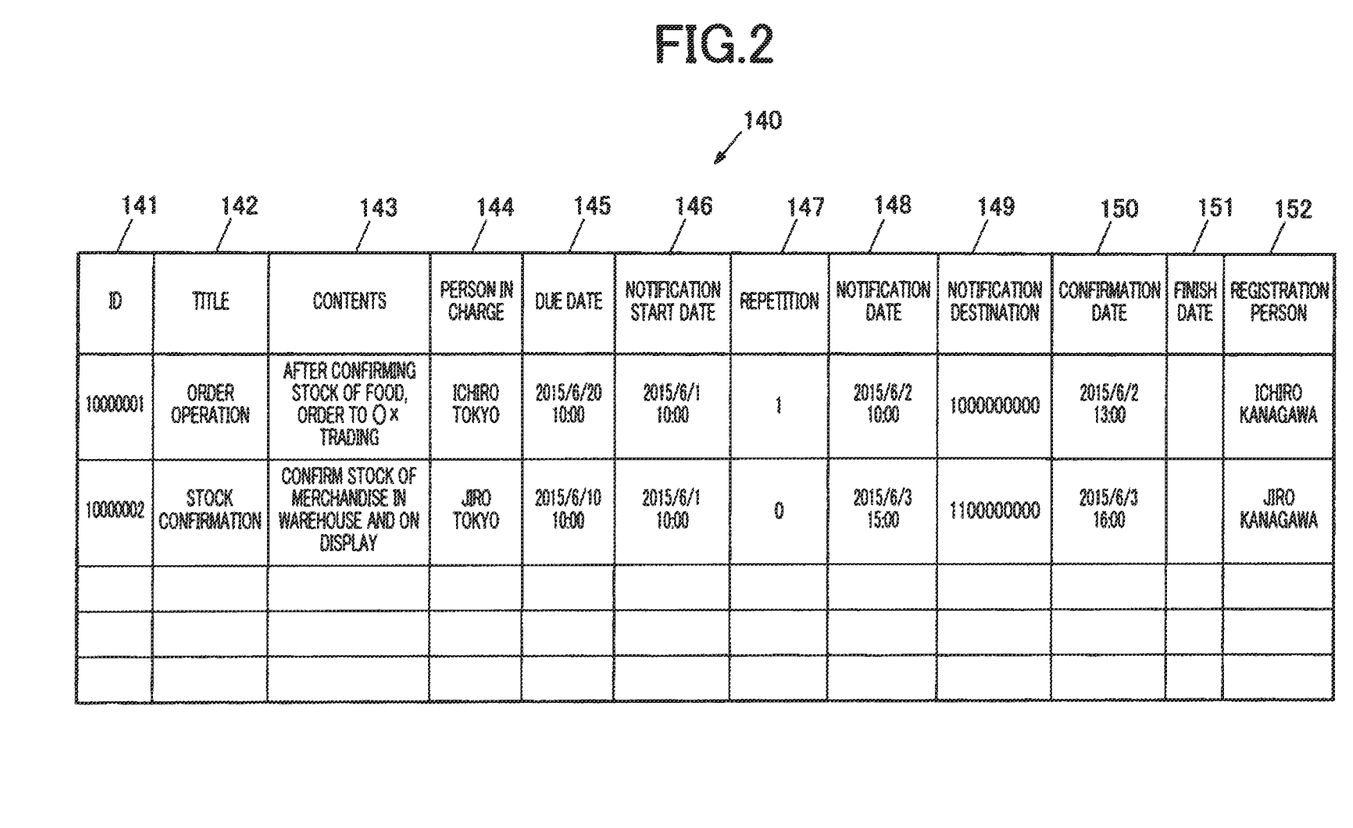
FIG. 2 is a diagram showing an example of To Do information data.

As shown in FIG. 2, the To Do information data 140 includes the following information, ID141 which is a number to be able to discriminate and manage the To Do items, a title 142 which shows the name of the To Do item, contents 143 which shows the contents of the To Do item, person in charge 144 which shows who is to perform the To Do item, due date 145 which shows the due date of performing the To Do item, notification start date 146 which shows the date when notification of the To Do item starts, repetition 147 which shows setting of repeating the To Do notification, notification date 148 which shows the date when the To Do notification is performed, notification destination 149 which shows the notification destination to which the To Do notification is performed, confirmation date 150 which shows the date that the To Do notification is confirmed, finish date 151 which shows the date that the To Do item is finished, and registration person 152 which shows who registered the To Do item.

The value of repetition 147 is defined with 0 to 2. Specifically, "0" is set when the notification is not repeated, "1" is set when the notification is repeated until the person in charge confirms the notification, and "2" is set when the notification is repeated until the To Do item is finished.

The value of the notification destination 149 is shown with a 10-digit number (the value of each digit is "0" or "1"), and the number of each digit is associated to a terminal (register terminal 3, client terminal 2) which is a target of notification.

According to the present embodiment, among the 10 digits, the number of the first digit corresponds to "the register terminal 3 in which the person in charge is changed (specified)", the number of the second digit corresponds to "the opened register terminal 3", the number of the third digit corresponds to "other status (mail notification, etc.)", and the number after the fourth digit is not corresponded to any particular terminal. In the value of the notification destination 149, "1" is set as the number of the digit corresponded to the terminal of the notification target, and "0" is set as the number of the other digits.

The communication unit 15 is a communication interface including a communication IC (Integrated Circuit), a communication connector, etc., and the communication unit 15 communicates data through the communication network N using a predetermined communication protocol under control of the controller 11.

The client terminal 2 is an information device such as a PC, a tablet terminal, a smartphone, a cellular phone, or the like.

As shown in FIG. 1, the client terminal 2 includes a controller 21, an operation unit 22, a display 23, a storage unit 24, and a communication unit 25.

The controller 21 centrally controls the operation of the client terminal 2. Specifically, the controller 21 includes a CPU, a ROM, a RAM or the like, and the CPU in coordination with the program data stored in the ROM or the storage 24 developed in the work region of the RAM controls each unit of the client terminal 2.

The operation unit 22 includes a keyboard including a character input key, a numeric input key, and other such keys corresponding to various functions, and a pointing device such as a mouse to receive input of operation from the user to output the operation signal corresponding to the input operation to the controller 21.

The display 23 includes a display such as a LCD and displays on a display screen an image based on a display control signal output from the controller 21.

The storage 24 includes a HDD, a semiconductor memory and the like, and stores data such as program data and various setting data from the controller 21 as readable and writable data.

The communication unit 25 is a communication interface including a communication IC, a communication connector, etc., and the communication unit 25 communicates data through the communication network N using a predetermined communication protocol under control of the controller 21.

The register terminal 3 is an ECR (electronic cash register) provided in a store such as a restaurant or a private store. The register terminal 3 receives identification information of the merchandise sold to the customer or information regarding the price and number of merchandise according to input operated by the clerk. In the register terminal 3, the sales data of the merchandise is calculated and registered, the payment from the customer is stored, and a receipt in which the sales data is printed on a recording sheet is issued. Examples of the register terminal 3 includes, a cash register, an electronic register, a money register, a POS (Point of Sale) terminal, and the like.

As shown in FIG. 1, the register terminal 3 includes a controller 31, an operation unit 32, a display 33, a storage 34, a communication unit 35, a printer 36, and a scanner 37.

The controller 31 centrally controls the operation of the register terminal 3. Specifically, the controller 31 includes a CPU, a ROM, a RAM or the like, and the CPU in coordination with the program data stored in the ROM or the storage 34 developed in the work region of the RAM controls each unit of the register terminal 3.

The operation unit 32 is a touch panel formed on the screen of the display 33 and outputs information according to input from the user touching the touch panel to the controller 31. The operation unit 32 can receive input by touching keys such as characters including text and numerals, and various other functions. The operation unit 32 may also include a plurality of keys to receive input of characters including text and numerals, and various other functions.

The display 33 includes a display such as a LCD and displays on a display screen an image based on a display control signal output from the controller 31.

The storage 34 includes a HDD, a semiconductor memory and the like, and stores data such as program data and various setting data from the controller 31 as readable and writable data.

The communication unit 35 is a communication interface including a communication IC, a communication connector, etc., and the communication unit 35 communicates data through the communication network N using a predetermined communication protocol under control of the controller 31.

The printer 36 is a printer such as a thermal printer which issues a receipt in which print information such as sales data is printed on a rolled recording sheet.

The printer 36 prints print information such as sales data on the recording sheet and issues the receipt according to the instruction from the controller 31.

According to the instruction from the controller 31, the printer 36 prints on the recording sheet print information including operation instruction information and confirmation information to notify whether the operation instruction information is confirmed or whether the contents of the operation instruction shown by the operation instruction information is finished. Then, the printer 36 issues the To Do information confirmation sheet so that the person in charge can confirm the To Do information.

The printer 36 includes a mechanism to cut and output the rolled recording sheet after printing the print information.

The scanner 37 is a scanner of a one-dimensional barcode. The scanner 37 reads the barcode and outputs the binarized image data of the barcode to the controller 31. For example, the scanner 37 is a laser scanner, but the scanner can be an image scanner which images the barcode. The controller 31 decodes the image data output from the scanner 37, and obtains the code information included in the barcode.

Next, the operation of the server apparatus 1 of the operation management system 100 of the present embodiment is described with reference to FIG. 3 to FIG. 6.

First, the process to register the To Do information and to generate the To Do information data 140 is described. The process starts when the To Do information registered by the user (clerk or manager) in the client terminal 2 is obtained from the client terminal 2.

First, the controller 11 of the server apparatus 1 generates the To Do information data 140 (see FIG. 2) based on the obtained To Do information. The To Do information transmitted from the client terminal 2 includes title 142, contents 143, person in charge 144, due date 145, notification start date 146, repetition 147, notification destination 149, registration person 152, etc. and the To Do information data 140 is generated based on the above information. The generated To Do information data 140 is stored in the storage 14.

For example, FIG. 2 shows an example of generating the To Do information data 140 associating ID 141 "10000001" when the To Do information including the following is transmitted from the client terminal 2, title 142 "order operation", contents 143 "after confirming stock of food, order to ○× trading", person in charge 144 "Ichiro Tokyo", due date 145 "2015/6/20, 10:00", notification start date 146 "2015/6/1, 10:00", repetition 147 "1", notification destination 149 "1000000000", registration person 152 "Ichiro Kanagawa".

When the To Do information data 140 is generated, the To Do item is not notified to the person in charge, and therefore, notification date 148, confirmation date 150, and finish date 151 are blank.

Figure 3:
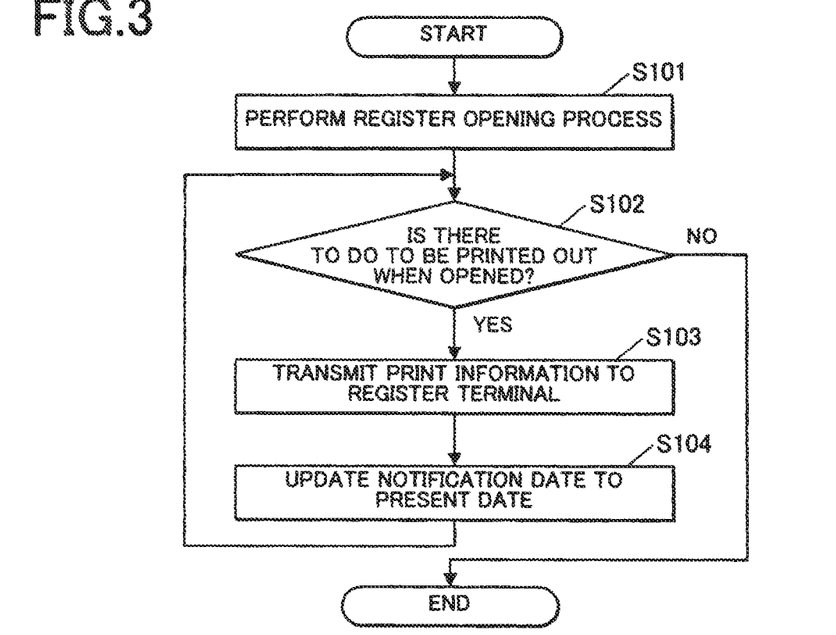
FIG. 3 is a flowchart showing a process when a register terminal is opened.

Next, the process when the register terminal 3 is opened at the start of operation at the beginning of the day is described with reference to the flowchart shown in FIG. 3. The process starts when the opening request transmitted from the register terminal 3 according to operation of the clerk is received.

First, the controller 11 of the server apparatus 1 performs a process to open the register terminal 3 from which the opening request is transmitted according to the obtained opening request (register opening process) (step S101).

Next, the controller 11 determines whether there is a To Do item to be printed when the register terminal 3 is opened (step S102). That is, the controller 11 functions as a searching unit of the present invention.

Specifically, first, the controller 11 refers to the To Do information data 140 stored in the storage 14, and searches for the To Do item including the notification start date 146 in which the present date passed the notification start date 146, and the opened register terminal 3 is set as the notification destination 149.

The controller 11 determines that there is a To Do item to be printed at the time of opening the register terminal 3 when any one of the 3 conditions described below is satisfied.

The first condition is "notification date 148 is blank", showing that the To Do item is not yet notified to the person in charge.

The second condition is "repetition 147 is "1" and confirmation date 150 is blank", showing that the notification of the To Do item is set to be repeated until the person in charge confirms the notification, and the person in charge has not yet confirmed the notification.

The third condition is "repetition 147 is "2" and finish date 151 is blank", showing that the notification of the To Do item is set to be repeated until the To Do item is finished, and the To Do item is not yet finished.

When the controller 11 determines that there is a To Do item to be printed at the time of opening the register terminal 3 (step S102: YES), the process advances to the next step S103.

When the controller 11 determines there is no To Do item to be printed at the time of opening the register terminal 3 (step S102: NO), the process ends.

Next, the controller 11 transmits the print information (print instruction information) regarding the ID141 of the To Do item determined to be the target of printing at the time of opening in step S102 through the communication unit 15 to the register terminal 3 from which the opening request is transmitted, and controls the printer 36 of the register terminal 3 to perform print processing (step S103).

That is, the controller 11 functions as a transmitting unit of the present invention. Here, the print information includes the To Do information data 140 (title 142, contents 143, person in charge 144, due date 145), contents confirmation barcode number (confirmation information), finish confirmation barcode number (confirmation information), etc.

Figure 4:
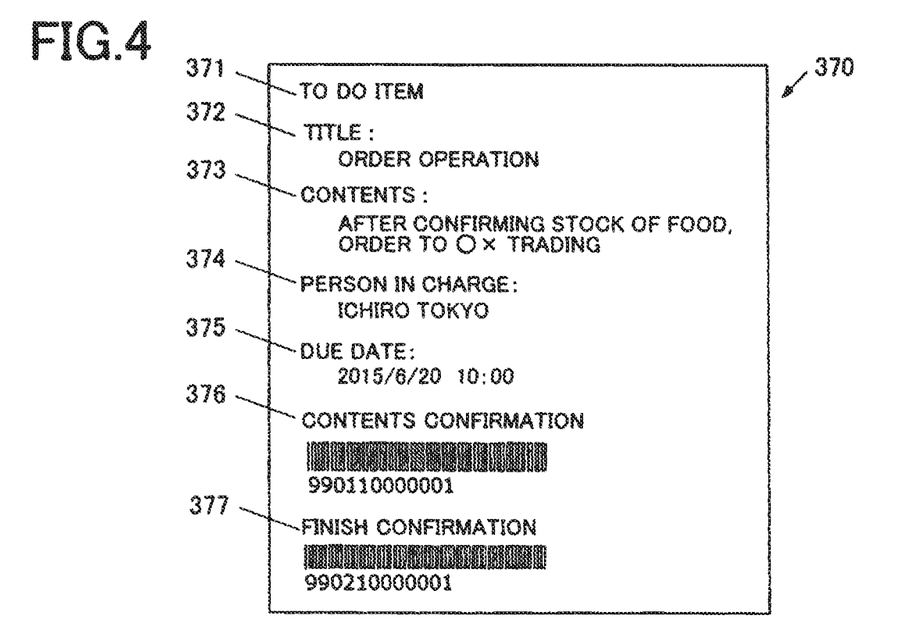
FIG. 4 is a diagram showing an example of a printed To Do information confirmation sheet.

The controller 31 of the register terminal 3 controls the printer 36 to print the To Do information confirmation sheet 370 based on the print information transmitted from the server apparatus 1. As shown in FIG. 4, in the To Do information confirmation sheet 370, the confirmation sheet title 371 including an arbitrary string of characters (To Do entry in FIG. 4), To Do information title 372, To Do information contents 373, person in charge 374, due date 375, contents confirmation barcode 376, and finish confirmation barcode 377 are printed.

For example, FIG. 4 shows an example of printing the To Do information confirmation sheet 370 when the ID141 of the To Do item determined to be the target of printing at the time of opening is "10000001".

That is, in the example shown in FIG. 4, title 142 "order operation", contents 143 "after confirming stock of food, order to ○× trading", person in charge 144 "Ichiro Tokyo", due date 145 "2015/6/20, 10:00" (see FIG. 2) of the ID141 "10000001" are printed in each region of the To Do information confirmation sheet 370 as To Do information title 372, To Do information contents 373, person in charge 374, and due date 375.

The contents confirmation barcode 376 is confirmation information to notify that the contents of the To Do information data 140 printed on the To Do information confirmation sheet 370 is confirmed. The contents confirmation barcode 376 is shown with a 12-digit number, and the first 2 digits are the To Do identification code, the next 2 digits are the control code, and the remaining 8 digits are the ID141 of the To Do item ("10000001" in FIG. 4).

The To Do identification code is a code to identify that the item is a To Do item, and "99" is set here. The control code is the code to discriminate whether the code is for confirming the contents or confirming that the operation is finished, and "01" is set here to show that the code is for confirming the contents.

The finish confirmation barcode 377 is confirmation information to notify that the contents of the operation instruction shown in the To Do information data 140 printed on the To Do information confirmation sheet 370 is finished. Similar to the contents confirmation barcode 376, the finish confirmation barcode 377 is shown with a 12-digit number, and the first 2 digits are the To Do identification code, the next 2 digits are the control code, and the remaining 8 digits are the ID141 of the To Do item ("10000001" in FIG. 4). As the control code, "02" is set to show that the code is for confirming that the operation is finished.

Next, the controller 11 updates the notification date 148 of the To Do item determined as the print target at the opening in step S102 to the present date (step S104). For example, when the date that the print information to print the To Do information confirmation sheet 370 shown in FIG. 4 is transmitted to the register terminal 3 is "2015/6/2 10:00", "2015/6/2 10:00" is input in the notification date 148 of ID141 "10000001" (see FIG. 2). Then, the process advances to step S102, and the process of step S102 and after is repeated.

According to the above process, the To Do items of the operation for that day can be printed in the opening processing which is always performed at the start of operation for that day, and the clerk is able to understand the operation for that day. The To Do information confirmation sheet on which the To Do item is printed can be pasted on a pinup board or a whiteboard so that the clerk who is not present at the time of opening processing is able to understand the operation for that day.

Figure 5:
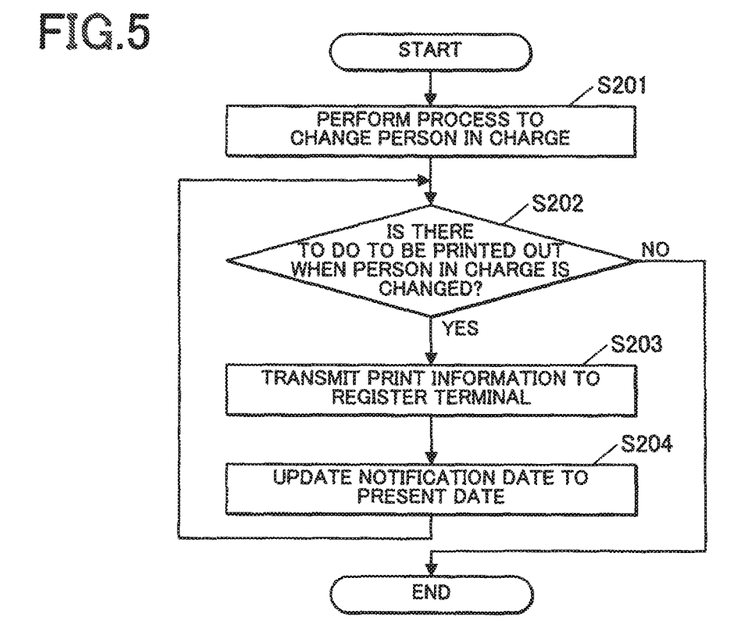
FIG. 5 is a flowchart showing a process when a person in charge of a register terminal changes.

Next, the process of changing the person in charge of the register terminal 3 is described with reference to the flowchart shown in FIG. 5. The process starts when the request to change the person in charge transmitted from the register terminal 3 according to operation by the clerk is obtained.

First, based on the obtained request to change the person in charge, the controller 11 of the server apparatus 1 performs a process to change the person in charge of the register terminal 3 from which the request to change the person in charge is transmitted (step S201).

Next, the controller 11 judges whether there is a To Do item to be printed when the person in charge of the register terminal 3 is changed (step S202). Specifically, first, the controller 11 refers to the To Do information data 140 stored in the storage 14, and searches for the To Do item in which the person in charge 144 is the same as the person in charge who requested the change of the person in charge from the register terminal 3, the notification start date 146 is past the present date, and the notification destination 149 includes the register terminal 3 in which the person in charge is changed.

Among the items which satisfy the above conditions, the controller 11 determines there is a To Do item to be printed at the time the person in charge is changed when any of the following 3 conditions is satisfied. The first condition is "notification date 148 is blank". The second condition is "repetition 147 is "1", and confirmation date 150 is blank". The third condition is "repetition 147 is "2", and finish date 151 is blank".

When the controller 11 determines there is a To Do item to be printed at the time of changing the person in charge of the register terminal 3 (step S202: YES), the controller 11 advances the process to the next step S203.

When the controller 11 determines there is no To Do item to be printed at the time of changing the person in charge of the register terminal 3 (step S202: NO), the process ends.

Next, the controller 11 transmits the print information regarding the ID141 of the To Do item determined to be the target of printing at the time of changing the person in charge in step S202 through the communication unit 15 to the register terminal 3 which transmitted the request to change the person in charge, and controls the printer 36 of the register terminal 3 to perform the printing process (step S203).

The contents of the print information is similar to the opening of the register terminal 3, specifically, To Do information data 140 (title 142, contents 143, person in charge 144, due date 145), contents confirmation barcode number, finish confirmation barcode number, and the like.

The controller 31 of the register terminal 3 controls the printer 36 to print the To Do information confirmation sheet 370 based on the print information transmitted from the server apparatus 1 (see FIG. 4). The information printed on the To Do information confirmation sheet 370 is similar to when the register terminal 3 is opened, specifically, confirmation sheet title 371, To Do information title 372, To Do information contents 373, person in charge 374, due date 375, contents confirmation barcode 376, and finish confirmation barcode 377.

Next, the controller 11 updates the notification date 148 of the To Do item determined to be the print target at the time the person in charge is changed in step S202 to the present date (step S204). Then, the process advances to step S202 and the process of step S202 and after is repeated.

According to the above process, the To Do item of the operation assigned to the person in charge can be printed at the timing when the person in charge of the register is changed, and therefore, it is possible to notify the To Do item directly to the person in charge.

Figure 6:
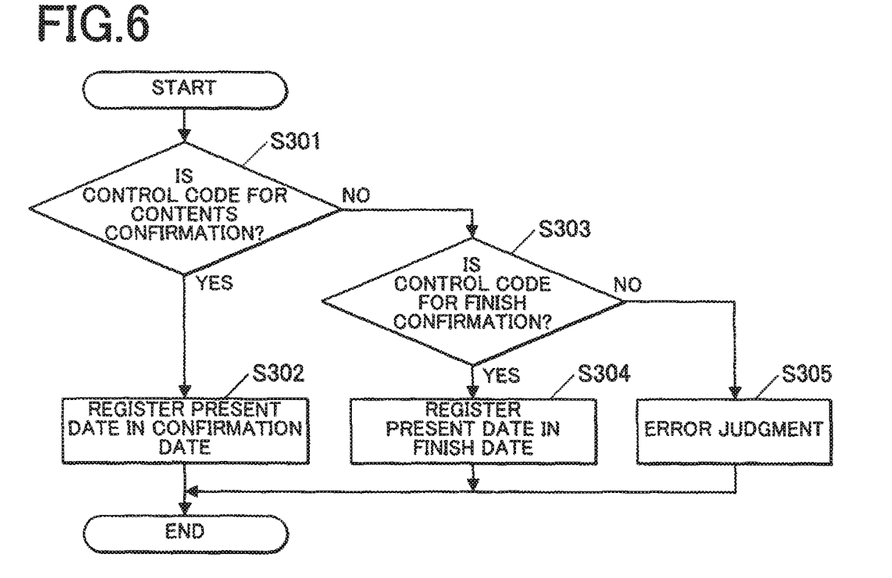
FIG. 6 is a flowchart showing a process when a barcode printed on a To Do information confirmation sheet is read.

Next, the process when the barcode printed on the To Do information confirmation sheet 370 is read is described with reference to the flowchart shown in FIG. 6. The process is started when the controller 11 of the server apparatus 1 obtains the information transmitted after reading the barcode (barcode information) with the scanner 37 of the register terminal 3 according to operation by the person in charge.

Here, the barcode information includes the To Do identification code, the control code, and the ID141. Such information is information to notify confirmation of the contents confirmation barcode 376 (confirmation information) or the finish confirmation barcode 377 (confirmation information) by the person in charge to the server apparatus 1.

The controller 11 receives the above notification and functions as the receiving unit of the present invention.

The controller 11 analyzes the To Do identification code, the control code, and the ID141 to determine whether the barcode information is information reading the contents confirmation barcode 376 or the information reading the finish confirmation barcode 377. The process of analyzing the barcode information is described in detail below.

The controller 11 refers to the obtained barcode information and determines whether "01" is set in the control code showing that the code is for confirming the contents (step S301).

When the controller 11 determines "01" is set in the control code (step S301: YES), the controller 11 determines the contents of the To Do item is confirmed by the person in charge, and the process advances to the next step S302.

When the controller 11 determines "01" is not set in the control code (step S301: NO), the process advances to step S303.

Next, the controller 11 registers the present date in the confirmation date 150 of the ID141 included in the obtained barcode information (step S302) and ends the process.

For example, when the date that the information read from the contents confirmation barcode 376 printed on the To Do information confirmation sheet 370 shown in FIG. 4 is obtained from the register terminal 3 is "2015/6/2 13:00", "2015/6/2 13:00" is input in the confirmation date 150 of the ID 141 "10000001" (see FIG. 2).

When the controller 11 determines that "01" is not set in the control code in step S301, the controller 11 refers to the obtained barcode information and determines whether "02" is set in the control code showing the code is for confirming that the operation is finished (step S303).

When the controller 11 determines that "02" is set in the control code (step S303: YES), the controller 11 determines that the person in charge confirmed the To Do item is finished, and the process advances to the next step S304.

When the controller 11 determines that "02" is not set in the control code (step S301: NO), the controller 11 determines there is an error in the read barcode (step S305) and the process ends.

Next, the controller 11 registers the present date in the finish date 151 of the ID141 included in the obtained barcode information (step S304) and ends the process. In other words, the date that the information read from the finish confirmation barcode 377 printed on the To Do information confirmation sheet 370 is obtained from the register terminal 3 is input in the finish date 151 of the ID141 included in the read information.

According to the above process, the confirmation date 150 and the finish date 151 of the To Do item is registered, and therefore, the manager or clerk who registered the To Do item is able to easily confirm whether the To Do item is confirmed or finished.

As described above, according to the server apparatus 1 of the operation management system 100 of the present embodiment, based on the request from the register terminal 3, the operation instruction to be printed with the register terminal 3 is searched, and the print instruction information to be printed with the register terminal 3 to print the found operation instruction information, and the confirmation information to notify that the operation instruction information is confirmed or the contents of the operation instruction shown in the operation instruction information is finished is transmitted to the register terminal 3.

The notification based on the confirmation information included in the transmitted print instruction information is received.

Therefore, at the time that the register terminal 3 is opened or when the person in charge of the register terminal 3 is changed, the To Do item suitable for the operation for that day can be printed for the person in charge. Therefore, the To Do item can be directly notified to the person in charge.

In addition to the To Do item, the confirmation information to notify that the contents of the To Do item are confirmed or that the operation of the To Do item is finished can be printed at the same time. Therefore, it is possible to easily confirm the contents of the To Do item or to confirm that the operation of the To Do item is finished by simple operation of reading the information.

According to the present embodiment, the confirmation information is printed as the barcode, and notification based on the confirmation information (printed barcode) read by the reading unit (scanner 37) of the register terminal 3 is received.

Therefore, the person in charge is able to confirm the confirmation information and read the barcode corresponding to the confirmation contents using the scanner 37 on the spot. Therefore, the person in charge is able to easily notify the confirmation of the contents of the To Do item or the finish of the operation in the To Do item without forgetting.

The present invention is specifically described according to the present embodiment, but the present invention is not limited to the above embodiments, and the present invention can be changed without leaving the scope of the invention.

For example, according to the above embodiment, the server apparatus 1 receives the notification based on the confirmation information, but the present invention is not limited to the above. Instead of the server apparatus 1 receiving the notification, the notification can be received with the portable terminal owned by the manager or owner.

In this case, the manager or owner is able to receive the notification even when the manager or owner is on holiday or outside. Therefore, the manager or owner is able to obtain the status of the confirmation of the contents of the To Do item and the confirmation of finishing the operation of the To Do item by each person in charge according to necessity, and management of the store can be performed more stably.

According to the above described embodiment, the confirmation information is printed as a barcode, but the present invention is not limited to the above.

For example, the confirmation information can be printed represented by a predetermined numeral. In this case, the person in charge who confirmed the confirmation information operates the operation unit 32 of the register terminal 3 and inputs the printed numeral. With this, the confirmation of the contents of the To Do item, and the confirmation that the operation of the To Do item is finished can be notified to the server apparatus 1.

The confirmation information can be printed as a QR code (registered trademark). In this case, the person in charge who confirmed the confirmation information reads the printed QR code with the scanner 37 of the register terminal 3. With this, the confirmation of the contents of the To Do item, and the confirmation that the operation of the To Do item is finished can be notified to the server apparatus 1.

Alternatively, the person in charge who confirmed the confirmation information can read the printed QR code with a portable terminal such as a smartphone, and the confirmation of the contents of the To Do item, and the confirmation that the operation of the To Do item is finished can be notified to the server apparatus 1. The confirmation information is not limited to the QR code and can be printed as any other two-dimensional code.

That is, the controller 11 of the server apparatus 1 functions as the receiving unit of the present invention and receives the notification based on the confirmation information (printed barcode or two-dimensional code) read by the scanner 37 of the register terminal 3.

The specific configuration and operation of each unit composing the server apparatus, the client terminal, and the register terminal can be suitably changed without leaving the scope of the present invention.

This application is based upon and claims the benefit of priority from the prior Japanese Patent Application No. 2015-153469, filed Aug. 3, 2015, the entire contents of which are incorporated herein by reference.

What is claimed is:

1. An operation management apparatus comprising:
   a searching unit which, according to a request from a register terminal, searches for operation instruction information which includes the register terminal as a notification destination of the operation instruction information and which is to be printed by the register terminal from a predetermined database and reads out the operation instruction information; and
   a transmitting unit which transmits to the register terminal print instruction information so that the register terminal prints the operation instruction information searched and read out by the searching unit and confirmation information to notify from the register terminal that the operation instruction information is confirmed or that the contents of the operation instruction shown in the operation instruction information is finished.

2. The operation management apparatus according to claim 1, further comprising a receiving unit which receives notification based on the confirmation information.

3. The operation management apparatus according to claim 2, wherein, the confirmation information is printed as a barcode or a two-dimensional code; and
   the receiving unit receives a notification based on the confirmation information read by a reading unit of the register terminal.

4. The operation management apparatus according to claim 1, wherein, the confirmation information is printed as a barcode or a two-dimensional code.

5. An operation management system comprising:
   a register terminal which includes a printing unit to print a receipt; and
   a server apparatus connected to communicate with the register terminal,
   wherein, the server apparatus includes:
   a searching unit which, according to a request from a register terminal, searches for operation instruction information which includes the register terminal as a notification destination of the operation instruction information and which is to be printed by the register terminal from a predetermined database and reads out the operation instruction information; and
   a transmitting unit which transmits to the register terminal print instruction information so that the register terminal prints the operation instruction information searched and read out by the searching unit and confirmation information to notify from the register terminal that the operation instruction information is confirmed or that the contents of the operation instruction shown in the operation instruction information is finished,
   and
   wherein, the register terminal prints the operation instruction information and the confirmation information on a recording sheet with the printing unit based on the print instruction information when the print instruction information is received.

6. The operation management system according to claim 5, wherein, the server apparatus includes a receiving unit which receives notification based on the confirmation information.

7. The operation management system according to claim 6, wherein, the confirmation information is printed as a barcode or a two-dimensional code; and
   the receiving unit receives a notification based on the confirmation information read by a reading unit of the register terminal.

8. The operation management system according to claim 5, wherein, the confirmation information is printed as a barcode or a two-dimensional code.

9. A non-transitory computer-readable storage medium having a program stored thereon for controlling a computer to perform:
   searching, according to a request from a register terminal, for operation instruction information which includes the register terminal as a notification destination of the operation instruction information and which is to be printed by the register terminal from a predetermined database and reads out the operation instruction information; and
   transmitting to the register terminal print instruction information so that the register terminal prints the searched and read out operation instruction information and confirmation information to notify from the register terminal that the operation instruction information is confirmed or that the contents of the operation instruction shown in the operation instruction information is finished.

10. The computer-readable storage medium according to claim 9, further comprising receiving notification based on the confirmation information.

11. The computer-readable storage medium according to claim 10, wherein, the confirmation information is printed as a barcode or a two-dimensional code; and
   a notification is received based on the confirmation information read by a reading unit of the register terminal.

12. The computer-readable storage medium according to claim 9, wherein, the confirmation information is printed as a barcode or a two-dimensional code.

* * * * *